United States Patent Office 3,458,410
Patented July 29, 1969

---

3,458,410
PURIFICATION OF ETHERS
Evan A. Mayerle and Edward A. Hunter, Lake Jackson, Tex., assignors to Nalco Chemical Company, Chicago, Ill., a corporation of Delaware
No Drawing. Filed July 30, 1965, Ser. No. 476,187
Int. Cl. B01k 3/00
U.S. Cl. 204—59          14 Claims

ABSTRACT OF THE DISCLOSURE

Ethers and particularly ethers used as solvents for Grignard reagents in electrolytes are purified by contacting them with sulfuryl chloride in sufficient amount to reduce the concentration of the alcoholic impurities.

---

This invention relates to the purification of ethers and more particularly to the purification of ethers used as solvents for Grignard reagents in electrolytes which are electrolyzed, using a lead anode, to produce organic lead compounds.

In the manufacture of organic lead compounds by electrolyzing a solution of a Grignard reagent in an ether, using a lead anode, various polyethers of glycols have heretofore been employed as solvents. When the electrolyte is processed in order to recover organic lead compounds therefrom, these ether solvents are sometimes decomposed to give alcoholic by-products of which an appreciable fraction is preferentially soluble in the ether stream. The ethers containing these ether soluble impurities, if recycled back into the electrolyte, will react with the Grignard reagent and cause losses of magnesium and organic halides, thereby increasing the cost and reducing the efficiency of the process.

One of the objects of the present invention is to provide a new and improved process for removing active hydrogen compounds, such as alcoholic impurities, from organic polyethers without otherwise adversely affecting the utility of these ethers as solvents for Grignard reagents in electrolytes employed in an electrolytic system for making organic lead compounds, using a lead anode.

A further object of the invention is to provide a process for purifying organic ethers which can be employed not only in the recovery system for the removal of active hydrogen compounds, such as alcohols, prior to recycling the ether solvent, but also in the initial treatment of the solvent in order to remove such impurities when the electrolyte is first prepared, that is, when the organic polyether is first used to make a solvent solution of the Grignard reagent.

A more specific object of the invention is to provide a new and improved process for purifying organic polyethers used in electrolytes containing a Grignard reagent made by reacting magnesium and methyl chloride in an organic diether solvent.

Another specific object of the invention is to provide a new and improved process for purifying rather heavy or high boiling organic polyethers which boil at temperatures above 110° C.

A further specific object of the invention is to provide a new and improved process for purifying solvent mixtures which contain organic polyethers as well as other organic compounds, including, for example, hydrocarbons, and/or tetrahydrofuran. Other objects will appear hereinafter.

In accordance with the present invention it has been found that organic polyether solvents containing active hydrogen compounds, such as alcohols, can be purified by bringing them into contact with sulfuryl chloride ($SO_2Cl_2$).

In order to evaluate the invention the impurity level of the organic polyether was measured by an activity test which was a modified Zerewitenoff test wherein a 10 ml. sample of the material to be tested was added to an excess of Grignard reagent and the volume of gas evolved was measured to determine the content of active hydrogen impurities (alcohols). By measuring the activity before and after treatment with sulfuryl chloride, it is possible to determine the percent reduction of active hydrogen impurities resulting from the sulfuryl chloride treatment.

The invention will be further illustrated but is not limited by the following examples in which the quantities are by weight unless otherwise indicated.

EXAMPLE I 897 grams of plant dried hexyl ethyl carbitol (containing about 20% diphenyl) was contacted with 4.5 grams $SO_2Cl_2$ at about 100° C. The mixture was agitated and held at this temperature. At intervals, samples were pulled from the mixture, neutralized with $Na_2CO_3$ solution, washed in water, and dried by blowing with nitrogen at 100° C. to 110° C. The materials were then analyzed for active hydroxyl content by adding a 10 ml. sample to an excess of methyl magnesium chloride and measuring the mls. of gas evolved ("activity"):

In this test, the activity in terms of milliliters of gas per 10 ml. sample of the untreated hexyl ethyl Carbitol was 50. Treatment with 0.5% of sulfuryl chloride for one hour reduced the activity to about 30. An additional contact period up to 4 hours reduced the activity to about 25. Thus, 50% to 60% of the active hydrogen impurities were removed. The resultant product could then be recycled for use in preparing additional quantities of Grignard reagent without substantial losses of magnesium and organic halide.

EXAMPLE II 894 grams of plant dried hexyl ethyl ether of diethylene glycol (about 20% diphenyl) was contacted with agitation at 100° C. to 110° C. with 44 grams sulfuryl chloride. As in Example I, samples were pulled at intervals, neutralized, washed and dried. The dried samples were then analyzed for activity.

In this test, the quantity of sulfuryl chloride was 5% by weight of the solvent. The solvent before the test had an activity of 48 which was reduced by treatment with the sulfuryl chloride to a value of about 20 in 1 hour. Thus, there was a removal of active hydrogen impurities of about 58%.

EXAMPLE III 905 grams plant dried hexylethyl ether of diethylene glycol (about 20% diphenyl) was treated as in Example II with 19 grams sulfuryl chloride. The activity data was determined on samples pulled at intervals during the treatment.

The initial activity of 42 was reduced to an equilibrium value of about 24 in 15 minutes or less.

EXAMPLE IV

This example illustrates the use of various proportions of sulfuryl chloride and shows the results obtained at various temperatures and at times of treatment in the purifying of a heavy ether which in this case was the hexyl ethyl ether of diethylene glycol.

The method of treatment and of determining activity was carried out as previously described with the results shown in the following table.

The method of treatment and of determining activity was carried out as previously described with the results shown in the following table.

TABLE

| Heavy ether, grams | SO$_2$Cl$_2$ | | Temp., °C. | Time, minutes | Impurity level of ether | | |
|---|---|---|---|---|---|---|---|
| | grams | Wt. percent on ether | | | Untreated | Treated | Percent reduction |
| 227 | 3.34 | 1.45 | 90 | 15 | 56 | 42 | 25 |
| 227 | 10.0 | 4.22 | 90 | 30 | 56 | 22 | 61 |
| 227 | 25.1 | 10.0 | 35 | 15 | 53 | 23 | 57 |
| 227 | 50.1 | 18.1 | 35 | 30 | 56 | 31 | 44 |

It will be seen from the table that a very substantial purification was obtained by treatment with sulfuryl chloride under various conditions and in various proportions.

In general, it is preferable to use at least 0.5% by weight of sulfuryl chloride based on the weight of the organic polyether but smaller amounts can be used and still obtain some degree of purification. Large amounts up to about 25% by weight of sulfuryl chloride based upon the weight of the ether have been employed but the improvement in results does not appear to justify their use. A preferred amount is within the range of 1% to 5%.

The temperatures employed in the treatment are subject to variation but are preferably within the range of 25° C. to 110° C.

The time of treatment is also subject to variation but is preferably within the range of 10 to 60 minutes. Even a few minutes contact time has an appreciable effect.

While the invention is generally applicable to the treatment of organic polyethers containing active hydrogen compounds, such as alcohols, its use is particularly important in the purification of polyethers of glycols having the following general formulae:

(1) R—O—R$_1$—O—R$_5$
(2) R—O—R$_1$—O—R$_2$—O—R$_5$
(3) R—O—R$_1$—O—R$_2$—O—R$_3$—O—R$_5$
(4) R—O—R$_1$—O—R$_2$—O—R$_3$—O—R$_4$—O—R$_5$ where the radicals R and R$_5$ are hydrocarbon radicals and the radicals R$_1$, R$_2$, R$_3$ and R$_4$ are alkylene radicals containing two to six carbon atoms. Thus, one of the radicals R or R$_5$ can be hexyl and the other ethyl; one can be hexyl and the other propyl or isopropyl; one can be hexyl and the other butyl, secondary butyl, isobutyl or tertiary butyl; one can be hexyl and the other amyl or isoamyl; or both can be phenyl; or one can be benzyl and the other ethyl. The radicals R$_1$, R$_2$, R$_3$ and R$_4$ are preferably ethylene but can be, for example, propylene, 1,2-propylene, butylene, amylene or hexylene. For use in electrolytes of the type previously described, the radicals R and R$_5$ should preferably be such that the polyether glycols are liquid at 20° C.

The term "Grignard reagent" as used herein refers to the product obtained by reacting approximately equimolar proportions of a compound having the formula RX and Mg according to the equation:

$$RX + Mg \rightarrow RMgX$$

in which R represents the organic radical, X represents the halogen atom of the Grignard reagent, and Mg is the conventional symbol for magnesium. The radical R can be, for example, methyl, ethyl, propyl, isopropyl, butyl and higher homologues, phenyl, benzyl, and the like. The radical X can be, for example, chlorine, bromine or iodine.

The invention is especially useful in purifying an ether solvent solution of a Grignard reagent which is electrolyzed in the presence of a sacrificial lead anode and in which R is methyl and/or ethyl, and X is chlorine. Thus, tetramethyl lead can be made by electrolyzing methyl magnesium chloride in an anhydrous ether solution, using a lead anode, and tetraethyl lead can be made by electrolyzing ethyl magnesium chloride in an anhydrous ether solution, using a lead anode.

The invention is also useful in the manufacture of mixed alkyl lead compounds, such as, triethylmethyl lead, diethyldimethyl lead and ethyltrimethyl lead, usually in the form of mixtures with tetraethyl lead and tetramethyl lead by using as the electrolyte mixtures of methyl magnesium chloride and ethyl magnesium chloride in an ether. Specific examples of other Grignard reagents are ethyl magnesium bromide, isopropyl magnesium chloride, isopropyl magnesium bromide, butyl magnesium chloride, butyl magnesium bromide, amyl magnesium bromide, amyl magnesium chloride, and higher alkyl homologues. Similarly, the phenyl magnesium chloride, phenyl magnesium bromide or mixtures of phenyl and ethyl magnesium chloride, or mixtures of phenyl and ethyl magnesium bromide, or mixtures of phenyl and methyl magnesium chloride, or mixtures of phenyl and methyl magnesium bromide can be electrolyzed to produce other organic lead compounds containing the phenyl radical or both the phenyl and ethyl radicals, or both the phenyl and methyl radicals, or both the phenyl and other alkyl radicals in case a higher alkyl magnesium halide is substituted for the ethyl magnesium halide or the methyl magnesium halide. In a similar manner benzyl magnesium chloride in an organic ether can be employed as an electrolyte.

The electrolyte can, and preferably does, contain an excess of organic halide over that required to form the Grignard reagent.

The ether to be purified can also contain one or more hydrocarbons such as, for example, toluene, benzene, xylene, and diphenyl. The amounts of these hydrocarbons in the electrolyte solvents usually do not exceed 25% by weight of the total solvent. Other substances, such as tetrahydrofuran, can be present and do not interfere with the purification treatment.

As indicated by the examples, it is desirable to wash the sulfuryl chloride treated ether material with water and thereafter to dry it. Drying is especially important where the purified material is to be used as a solvent for a Grignard reagent.

In making organic lead compounds by a process of the type described using an ether of the type described as a solvent for the Grignard reagent, one method of operation is to pass the spent electrolyte containing the organic lead compound, or compounds, and the ether solvent with or without other solvents such as hydrocarbons and tetrahydrofuran and excess organic halide and unreacted Grignard reagent into a recovery system where the organic lead compound, or compounds, is separated and removed from the solvent system. Where lower boiling solvents, such as, tetrahydrofuran, are present, these are usually separated by fractional distillation or in some other suitable manner. Lower boiling hydrocarbon solvents, such as toluene, are usually allowed to remain with the organic lead product, especially where the latter has a boiling point close to that of toluene, as in the case of tetramethyl lead. If higher boiling organic solvents, such as, diphenyl, are used in the process, these are usually allowed to remain with the higher boiling ethers and the mixture of higher boiling ethers and higher boiling hydrocarbon solvents is recycled. During this recovery procedure acids or other neutralizing agents can be added in order to remove unreacted Grignard reagent, and excess organic halide, if volatile, can be removed by volatilization in a conventional gas stripping apparatus. Some of these procedures, expecially heating and acidizing, have a degrading effect on the ethers causing the formation of active hydrogen impurities, such as alcohols, which are undesirable because they react with the Grignard reagent in the manner previously explained. The present invention makes it possible to control this degradation of these ethers and the formation of active hydrogen impurities by the simple addition of a small amount of sulfuryl chloride which does not have any degrading effect in itself and does not interfere with the normal operation of the electrolytic process or the recovery system. This addition of sulfuryl chloride can be made intermittently or continuously to the recovered solvents after the removal of the organic lead compounds. The addition can also be made before the separation of all of the organic lead compounds, for example, by intermittently adding a small stream of sulfuryl chloride to the residue remaining after removal of most of the organic lead compounds from the spent electrolyte. However, addition of sulfuryl chloride to solvent streams containing substantial amounts of organic lead compounds should be avoided since sulfuryl chloride will destroy the organic lead compound with consequent economic loss.

The invention is hereby claimed as follows:

1. A process for purifying ethers containing alcoholic impurities which comprises contacting said ethers with sulfuryl chloride in an amount effective to reduce the concentration of the active hydrogen impurities.

2. A process as claimed in claim 1 in which the ether is mixed with a hydrocarbon.

3. A process as claimed in claim 1 in which the resultant product is washed with water and dried.

4. A process as claimed in claim 1 in which the resultant product is neutralized, washed with water, and dried.

5. A process for removing alcoholic impurities present in polyethers of glycols having the following formulae:

(1)         R—O—R$_1$—O—R$_5$
(2)         R—O—R$_1$—O—R$_2$—O—R$_5$
(3)   R—O—R$_1$—O—R$_2$—O—R$_3$—O—R$_5$
(4) R—O—R$_1$—O—R$_2$—O—R$_3$—O—R$_4$—O—R$_5$ where R and R$_5$ are hydrocarbon radicals, and the radicals R$_1$, R$_2$, R$_3$ and R$_4$ are alkylene radicals containing 2 to 6 carbon atoms which comprises contacting such polyethers containing such impurities with sulfuryl chloride in amounts effective to reduce the concentration of the active hydrogen impurities.

6. A process a claimed in claim 5 in which the resultant product is washed with water and dried.

7. A process as claimed in claim 2 in which the ether is mixed with a hydrocarbon.

8. A process for purifying the hexylethylether of diethylene glycol containing alcoholic impurities which comprises contacting it with a quantity of sulfuryl chloride effective to reduce the concentration of said impurities.

9. A process for purifying the benzylethylether of triethylene glycol containing alcoholic impurities which comprises contacting it with a quantity of sulfuryl chloride effective to reduce the concentration of said impurities.

10. A process as claimed in claim 9 in which said ether solvent after treatment with sulfuryl chloride and before recycling is washed with water and dried.

11. A process as claimed in claim 9 in which said ether solvent after treatment with sulfuryl chloride and before recycling is neutralized, washed with water and dried.

12. A process as claimed in claim 9 in which the recycled ether also contains up to 25% by weight of a hydrocarbon.

13. A process for purifying the diethylether of tetraethylene glycol containing alcoholic impurities which comprises contacting it with a quantity of sulfuryl chloride effective to reduce the concentration of said impurities.

14. In the electrolytic manufacture of organic lead compounds wherein an electrolyte comprising a solution of a Grignard reagent in an ether solvent is electrolyzed, using a lead anode, and the ether solvent is recovered in a recovery system and recycled for use in the preparation of additional quantities of electrolyte, the step which comprises treating said solvent prior to recycling with sulfuryl chloride in sufficient amount to reduce the concentration of alcoholic impurities.

References Cited

UNITED STATES PATENTS

| 2,817,686 | 12/1957 | Cicero et al. | 260—613 |
| 3,118,825 | 1/1964 | Linsk | 204—59 |
| 3,236,887 | 2/1966 | Hooks et al. | 204—158 XR |
| 3,296,314 | 1/1967 | Burns et al. | 260—616 |

FOREIGN PATENTS

| 259,329 | 10/1926 | Great Britain. |

OTHER REFERENCES

Kharasch et al.: J.A.C.S., vol. 61 (August 1939), pp. 2142–2150.

HOWARD S. WILLIAMS, Primary Examiner

U.S. Cl. X.R.

260—613, 615, 616

UNITED STATES PATENT OFFICE
CERTIFICATE OF CORRECTION

Patent No. 3,458,410                                  July 29, 1969

Evan A. Mayerle et al.

It is certified that error appears in the above identified patent and that said Letters Patent are hereby corrected as shown below:

Column 3, lines 6 to 8, cancel "The method of treatment and of determining activity was carried out as previously described with the results shown in the following table.". Column 6, line 1, claim reference numeral "2" should read -- 5 --.

Signed and sealed this 21st day of April 1970.

(SEAL)
Attest:

Edward M. Fletcher, Jr.                         WILLIAM E. SCHUYLER, JR.
Attesting Officer                                      Commissioner of Patents